Patented Dec. 27, 1949

2,492,442

UNITED STATES PATENT OFFICE 2,492,442

METHOD OF PRODUCING ESTERS OF CELLULOSE

George A. Richter, Jr., Springfield, Pa., assignor to American Viscose Corporation, Wilmington, Del., a corporation of Delaware No Drawing. Original application March 16, 1944, Serial No. 526,812. Divided and this application March 7, 1947, Serial No. 733,202

6 Claims. (Cl. 260—225)

This application is a division of my pending application, Serial No. 526,812, filed March 16, 1944, now abandoned.

This invention relates to modified cellulose esters and more particularly to cellulose esters containing chemically bound radicals derived from agents which are capable of reacting bifunctionally with cellulose.

Cellulose fibers have an extremely high degree of plasticity which is accompanied by low elasticity, and tend to undergo irreversible flow under moderate stresses. Products molded from cellulose or its derivatives, such as cellulose esters, exhibit the same properties and tend to become deformed under stress, and this tendency is not reversed and the products do not revert to their original form when the stress is removed.

I have now prepared a series of modified cellulose esters which also contain chemically bound radicals derived from agents which are capable of reacting bifunctionally with cellulose, the properties of which are radically different from those of cellulose or unmodified esters thereof, in that in the new products the high degree of plasticity which is a distinguishing characteristic of cellulose or cellulose esters is modified in favor of a greatly enhanced elasticity.

The esters preferably contain from about one or less than one radical derived from the agent capable of reacting bifunctionally with cellulose per about 20 anhydro glucose units to one or less than one such radical per 500 anhydro glucose units or more. Of course, the ratio of the modifying radicals to glucose units may vary, but where the ratio is substantially higher than one in 20, the resulting product is extremely rigid and non-plastic.

In accordance with the invention, the radicals derived from agents capable of reacting bifunctionally with cellulose may be introduced simultaneously with or, in some cases, prior to the production of the esters.

According to one embodiment of the invention, at least one monobasic organic acid radical and at least one polybasic organic acid radical are introduced simultaneously into cellulose by reaction thereof with a monofunctional esterifying reagent and an esterifying agent capable of reacting bifunctionally with cellulose, the reaction being carried out in the presence of a substance in which the reaction product is at least partially solvated, that is, dissolved or swollen as it is formed during the reaction.

Suitable monofunctional reagents are monobasic organic acids, such as acetic, propionic, butyric, lauric acids, etc., anhydrides of such acids, and acid halides derived therefrom.

Suitable bifunctionally reacting agents are such polybasic organic acids as adipic, succinic, sebacic acids, etc., as well as polyhalides of such acids.

Diacids derived from glycol, as well as dihalides thereof, such as compounds having the general formula

XOCCH$_2$CH$_2$(OCH$_2$CH$_2$)$_n$CH$_2$CH$_2$COX where X is hydroxyl or halogen and $n$ is any integer but preferably from 1 to 4, inclusive, may also be used. Such diacids derived from glycol may be prepared by the general procedure described by Bruson, Journal American Chemical Society 64, pages 2457 and 2850.

In accordance with the invention, cellulose is simultaneously reacted with at least one polybasic organic acid, and at least one anhydride of a monobasic organic acid capable of esterifying cellulose, in the presence of a catalyst, which may be a mineral acid catalyst, for example, and a substance in which the reaction product is dissolved or swollen during the reaction. Alternatively, the cellulose may be simultaneously reacted with at least one monobasic organic acid, and at least one polybasic organic acid, in the presence of an "impeller" which may be an anhydride of a halogen-substituted monobasic organic acid, a catalyst, and a substance in which the reaction product is dissolved or swollen during the reaction.

Acid halides may also be used. Thus, the cellulose may be reacted simultaneously with at least one monobasic organic acid halide, and at least one polybasic organic acid halide, in the presence of a solvent or swelling agent for the reaction product and a condensing agent which is inert with respect to the halides, such as an organic base containing a nitrogen atom, all of the valences of which are attached to carbon, namely the tertiary amines of which pyridine, quinoline, and N-methyl morpholine are specifically named as examples.

According to another embodiment of the invention, introduction of the polybasic organic acid radicals may be effected, in some cases, prior to esterification of the cellulose with a monobasic organic acid. Thus, cellulose may be reacted with one or more diacids derived from glycol, or dihalides of such acids, in the presence of a condensing agent or catalyst, and the product thus obtained may then be subsequently reacted with at least one monobasic organic acid, in the usual manner.

An important feature of the invention is that the reaction is carried out in the presence of a substance in which the reaction product is dissolved or swollen as it is formed during the course of the reaction, which results in the reaction mass being maintained in a highly swollen or dissolved state and thus insures substantially uniform reaction between the cellulose and the monofunctional and bifunctional reagents. Such substances are for example, toluene, dioxane, acetone, etc. The final products which may be obtained by precipitating the reaction mass from water, may be soluble or substantially insoluble in such substances.

The amount of monofunctional reagent used may vary, but in general I prefer to use an amount thereof sufficient to form a tri-ester. If a more lowly esterified final product is desired, such as a secondary or mono ester, the tri-ester may be suitably hydrolyzed by conventional methods, after completion of the reaction with the bifunctionally reacting esterification agent.

By the choice of bifunctional esterification agent and the amount thereof participating in the reaction, it is possible to selectively adjust certain physical properties of the final products, such as solubilities and softening temperatures. Although in all cases the modified esters show a lesser degree of plasticity and a greater degree of elasticity, and in general much higher softening and melting temperatures and resistance to common solvents, as compared with corresponding cellulose esters which do not contain the modifying groups, modified esters may also be obtained which do not greatly differ from the unmodified esters in respect of solubility and softening temperatures. The degree to which the final modified esters are soluble in substances which are solvents for cellulose esters, such as acetone, dioxane, toluene, etc., for instance, may vary, depending upon the amount of bifunctional esterification agent used, greater amounts decreasing the solubility and lesser amounts increasing it. Thus, final products may be obtained which form smooth relatively clear solutions in solvents such as acetone, toluene, dioxane, etc., or which form extremely viscous gel-like masses therein. Also, final products may be obtained which are insoluble in such common solvents or which are merely swollen slightly when added thereto. Generally speaking, the modified esters do not have melting points below decomposition temperatures or sharp softening points, are substantially unaffected at temperatures at which the unmodified esters melt or soften, do not show a tendency to soften except within high temperature ranges, and at temperatures above the softening range are less plastic and more rubber-like than unmodified esters. However, the softening temperature in some instances may be varied, depending upon the amount and type of bifunctional esterification agent used, the tendency to soften at relatively low temperatures being more marked in those cases where such agent is used in relatively small amounts and has a longer chain as compared to the ester side chain derived from the monobasic acid. The use of marginal amounts of the bifunctional esterification agent in the reaction thus permits a sensitive adjustment of the solubility and softening characteristics of the end product. The amount of such agent to be used depends upon the properties desired in the final products. In general to achieve the objectives of this invention it is desirable to use the bifunctionally reacting agent, such as the dihalide of an organic dibasic acid, in amounts varying from $4 \times 10^{-5}$ to about $4 \times 10^{-4}$ mols thereof per 5 gms. of cellulose, the final product containing, usually, one or less than one dibasic acid radical per 20 anhydro glucose units, to one or less than one dibasic acid radical per 500 anhydro glucose units, or more.

The products are obtained in the form of fibrous masses which are, for the most part, insoluble, infusible, and heat-insensitive, but which in certain cases, as previously indicated, may be soluble to varying extents and more or less susceptible to softening by heat.

Some of the insoluble or substantially insoluble modified esters, such as cellulose butyrate containing sebacic acid radicals may be molded by compression and injection molding techniques to give molded articles which are characterized by hardness, resistance to cold flow, and resistance to flow at elevated temperatures. The molded products may undergo some flow under stress but due to their quality of rapid and substantially complete elastic recovery, show a lively return to their original form upon the removal of stress.

Those products which are soluble in solvents such as acetone, for example, may be dissolved therein and extruded through a spinneret or the like into an evaporative atmosphere, in accordance with the dry-spinning process, to form artificial filaments, or may be cast from such solutions to give films, sheets, coatings, etc., which are durable and stable.

If desired, substances may be added to the products to give various effects. Some of the substances which may be added are suitable coloring materials, such as dyes, pigments, particles of colored materials to give mottled effects, metallic particles or the like.

The products exhibit properties such as a lesser degree of plasticity, greatly increased elasticity, generally increased softening and melting temperature ranges, and range of solubility in common solvents which are distinctly different from the properties of corresponding cellulose esters, such as cellulose laurate, cellulose propionate, etc., which do not contain the chemically combined modifying polybasic acid radicals. While the reasons for the marked change in properties cannot be stated precisely, it is believed that the change may be predicated upon a chemical reaction of the polybasic acids or their halides with hydroxyl groups on parallel cellulose chains, so that cross-links are formed between the primary valence chains of the cellulose derivatives.

As previously indicated, the introduction of the radical or radicals derived from the bifunctional esterification agent may be effected simultaneously with, or in some instances, prior to substantial esterification of the cellulose with the monobasic acids or their halides, when the reaction is carried out in the presence of a solvent capable of swelling or dissolving the reaction product as it is formed during the reaction. However, it has not been found practicable to effect chemical combination of the polybasic acid radicals in the case of pre-shaped cellulose esters, and the more highly esterified the starting material the greater is the difficulty encountered.

It appears that the polyfunctional esterification agents, such as polyhalides of polybasic acids, react chemically with the free hydroxyls of previously shaped partially esterified cellulose, only with considerable difficulty, if at all, and that in all cases where shaped masses, fibers or the like consisting of or comprising partially esterified cellulose have been treated with polybasic acids or their polyhalides in the absence of an agent which is capable of dissolving or swelling the reaction product as it is formed, only superficial or surface effects have been obtained.

The invention will be further illustrated by the following examples in which the quantities are stated in parts by weight.

Example I

Five parts of air-dry wood pulp were suspended in a mixture of 50 parts of pyridine and 100 parts of toluene and the suspension was heated to 70–80° C. A 5% solution of 0.1 part of adipyl chloride in toluene was added to 40 parts of lauroyl chloride. The mixture was added dropwise to the above suspension, and the whole was heated to 75–85° C. for 4 hours. After precipitating and leaching with water, the reaction product (yield: 75% based on trilaurate) was obtained as a fibrous white mass which was substantially insoluble in toluene, did not soften below 140° C., and had no melting point. Unmodified cellulose laurate prepared under similar conditions softened at about 65° C.

Example II

The reaction was carried out in accordance with the procedure described in Example I, except that a 5% solution of 0.1 part of sebacoyl chloride were added to 40 parts of lauroyl chloride, and that mixture was added dropwise to the wood pulp suspension. After precipitating and leaching with water the reaction product (yield: 87% based on tri-laurate) was obtained as a fibrous white mass which was insoluble in toluene, did not soften below 210° C., and had no melting point.

Example III

Eight parts of air-dry wood pulp were suspended in a mixture of 80 parts of pyridine and 100 parts of dioxane, and the suspension was heated to 60 to 80° C. A 5% solution of 0.06 part of sebacoyl chloride in toluene was added to 32 parts of butyryl chloride, and that mixture was added dropwise, with constant stirring, to the suspension. The mixture was heated to 75–85° C. for 2½ hours. The reaction product (yield: 83% based on tri-butyrate) was precipitated and leached with water and a fibrous white mass was obtained, which was insoluble in acetone, and had a softening range of 130–135° C. The softening range of unmodified cellulose butyrate prepared under similar conditions was found to be 125–130° C.

Example IV

The procedure was the same as described in Example III except that a 5% solution of 0.01 part of sebacoyl chloride was added to 32 parts of butyryl chloride, and that mixture was added dropwise to the wood pulp suspension. The final product (yield: about 91% based on tributyrate) was precipitated and leached with water. A fibrous white mass was obtained which was soluble in acetone, had a softening range of 130–135° C., and could be drawn into filaments at 180–200° C.

Example V

Five parts of air-dry wood pulp were suspended in a mixture of 50 parts of pyridine and 80 parts of dioxane and the suspension was heated to 60–85° C. A mixture of 26 parts of caproyl chloride and 0.08 part of succinyl chloride was added dropwise to the above suspension, and the whole was heated at 75–85° C. for about 3 hours. After precipitating and leaching with water, the product was obtained as a white fibrous mass (yield: about 66% based on tricaproate). The product formed a very stiff gel in dioxane, and had a softening range of 120–130° C. Unmodified cellulose caproate prepared under similar conditions softened at about 80° C.

Example VI

Five parts of air-dry wood pulp were suspended in a mixture of 80 parts of pyridine and 100 parts of dioxane, and the suspension was heated to 60–80° C. 0.2 part of hexaglycol diacid chloride was mixed with 28 parts of propionyl chloride, and added dropwise to the wood pulp suspension: the mixture was kept at 75–85° C. for 3 hours. After precipitating and leaching with water the final product (yield: 97% based on tri-propionate) occurred in the form of a white mass which was soluble in acetone, had a softening range of 155–160° C., and could be drawn to coarse filaments at about 200° C.

Example VII

Five parts of air-dry wood pulp were suspended in a mixture of 80 parts of pyridine and 100 parts of dioxane, and the suspension was heated to 60–80° C. A mixture of 0.6 part of triglycol diacid chloride and 28 parts of propionyl chloride was added dropwise to the suspension, and the whole was heated at 75–85° C. for 2¾ hours. After precipitating and leaching the reaction product with water, a fibrous white mass was obtained (yield: 99% based on tri-propionate). The product formed a grainy solution in acetone, and had softening range of 155–160° C. Unmodified cellulose propionate softened at about 155° C.

Example VIII

Five parts of air-dry wood pulp were suspended in a mixture of 80 parts of pyridine and 100 parts of dioxane, and the suspension was heated to 60–80° C. A mixture of 0.55 part of pentaglycol diacid chloride and 10 parts of propionyl chloride was added dropwise to the suspension. 18 parts of propionyl chloride were then added and the mixture was heated at 75–85° C. for 2 hours. The product, after being leached with water, occurred in the form of a white, fibrous mass (yield: about 99% based on tri-propionate) which was soluble in acetone; had a softening range of 155–160° C., and which became rubber-like at 220–240° C.

Example IX

The procedure was the same as described in Example VIII except that a mixture of 0.8 part of pentaglycol diacid chloride and 10 parts of propionyl chloride was added to the wood pulp suspension.

The final product (yield: 96% based on tri-propionate) was a white, fibrous mass which formed a grainy solution in acetone, and had a softening range of 160–165° C.

Example X

The reaction was carried out in the manner described in Example VIII with the exception that a mixture of 1.12 parts of hexaglycol diacid chloride and 10 parts of propionyl chloride was added to the wood pulp suspension.

The product (yield: 76% based on tri-propionate) was a fibrous white mass which was soluble in acetone, had a softening range of about 160–165° C., and became rubber-like at 210–220° C.

*Example XI*

About 10 parts of cotton linters were treated with a mixture of 0.5 part of sebacic acid dissolved in 50 parts of glacial acetic acid for 2 hours at 38–45° C. after which 11.5 parts of glacial acetic acid and 0.02 part of sulfuric acid were added. The temperature was maintained at about 38–45° C. for 1½ hours, and then permitted to drop to 30° C., and maintained there for 1¼ hours. The mass was cooled to 18° C. About 25.7 parts of acetic acid anhydride cooled to 0° C. were added. The mass was then cooled to 10° C., and a mixture of 0.33 part of sulfuric acid and 0.57 part of glacial acetic acid was stirred into the mass, and the mixture was kept at 25° C. for about 3 hours. A very fibrous white mass was thus obtained. A mixture of 7 parts of sulfuric acid and 7 parts of glacial acetic acid was added, to hydrolyze the product to a secondary acetate. The hydrolyzed material was placed in a water bath at 40° C. for 24 hours. The mass was thinned with a little acetone and precipitated by stirring in water; the precipitate was washed and dried. The product did not have a melting point below decomposition; had a softening range of about 230–235° C., and was insoluble in acetone.

The above examples and description are given by way of illustration, and modifications or variations may be made therein without departing from the spirit and scope of the invention as defined in the claims.

I claim:

1. The process comprising simultaneously reacting cellulose with at least one monobasic organic acid halide and at least one polybasic organic acid halide, in the presence of an organic base containing a nitrogen atom all of the valences of which are attached to carbon, and a substance in which the reaction product is at least partially solvated during the reaction.

2. The process comprising simultaneously reacting cellulose with at least one polybasic organic acid halide of the general formula:

where $n$ is an integer, and Ha is halogen, and at least one monobasic organic acid halide, in the presence of an organic base containing a nitrogen atom all of the valences of which are attached to carbon, and a substance in which the reaction product is at least partially solvated during the reaction.

3. The process comprising simultaneously reacting cellulose with a sufficient amount of at least one monobasic organic acid halide to form substantially a tri-ester, and with at least one polybasic organic acid halide, in the presence of an organic base containing a nitrogen atom all of the valences of which are attached to carbon, and a substance in which the reaction product is at least partially solvated during the reaction, terminating the reaction when substantially a monobasic acid tri-ester has been formed, and hydrolyzing the tri-ester to a more lowly esterified product.

4. The process comprising simultaneously reacting cellulose with at least one monobasic organic acid halide and at least one polybasic organic acid halide in the presence of an organic base containing a nitrogen atom all of the valences of which are attached to carbon, and a substance in which the reaction product is at least partially solvated during the reaction, and terminating the reaction when substantially a monobasic acid tri-ester has been formed and the polybasic organic acid radicals have combined with the cellulose in a ratio of about one such radical per at least twenty anhydro-glucose units.

5. The process comprising simultaneously reacting cellulose with sebacoyl dichloride and butyryl chloride, in the presence of pyridine and dioxane.

6. The process comprising simultaneously reacting cellulose with adipyl dichloride and lauroyl chloride in the presence of pyridine and toluene.

GEORGE A. RICHTER, Jr.

REFERENCES CITED

The following references are of record in the file of this patent:

FOREIGN PATENTS

| Number | Country | Date |
|---|---|---|
| 291,360 | Great Britain | Sept. 27, 1928 |

OTHER REFERENCES

Malm et al., In. and Eng. Chem., 32:405 to 408 (March 1940).